United States Patent
Kanai et al.

(10) Patent No.: US 11,531,769 B2
(45) Date of Patent: Dec. 20, 2022

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Jun Kanai, Inagi (JP); Shinya Takumi, Kawasaki (JP); Yoshikazu Hanatani, Komae (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 215 days.

(21) Appl. No.: 16/554,700

(22) Filed: Aug. 29, 2019

(65) Prior Publication Data

US 2020/0293666 A1 Sep. 17, 2020

(30) Foreign Application Priority Data

Mar. 11, 2019 (JP) .............................. JP2019-044006

(51) Int. Cl.
*H04L 29/06* (2006.01)
*G06F 21/60* (2013.01)
(Continued)

(52) U.S. Cl.
CPC ............ *G06F 21/602* (2013.01); *H04L 9/085* (2013.01); *H04L 9/30* (2013.01); *H04L 9/3242* (2013.01)

(58) Field of Classification Search
CPC .. F16M 3/00; F16M 11/2021; F16M 11/2092; F16M 11/42; G06F 21/602; H04L 9/085; H04L 9/30
See application file for complete search history.

(56) References Cited

U.S. PATENT DOCUMENTS 7,134,141 B2 * 11/2006 Crosbie ................. G06F 21/552
726/23
7,194,623 B1 3/2007 Proudler et al.
(Continued)

FOREIGN PATENT DOCUMENTS

| JP | 4860856 B2 | 1/2012 |
| JP | 2017-010347 A | 1/2017 |

*Primary Examiner* — Joseph P Hirl
*Assistant Examiner* — Leynna Truvan
(74) *Attorney, Agent, or Firm* — Maier & Maier, PLLC

(57) ABSTRACT

According to an embodiment, an information processing apparatus includes: a memory on which first/second processing applications are stored, the first processing application being a secure application; and a processor that is coupled to the memory and executes the first and second processing applications. The first processing application includes an issuance module, a first communication module, and a log verification module. The issuance module issues a command to call a function of the second processing application and links the command to a verification rule. The first communication module transmits, to the second processing application, a command execution request including command identification information that identifies the command, and receives, from the second processing application, an execution log including an execution result of the command identified by the command identification information. The log verification module verifies correctness of the received execution log in accordance with the verification rule.

10 Claims, 15 Drawing Sheets

(51) Int. Cl.
  *H04L 9/32* (2006.01)
  *H04L 9/08* (2006.01)
  *H04L 9/30* (2006.01)

(56) References Cited

U.S. PATENT DOCUMENTS

| | | | |
|---|---|---|---|
| 2010/0132053 A1* | 5/2010 | Chishima | G06F 21/74 |
| | | | 726/30 |
| 2013/0097706 A1* | 4/2013 | Titonis | G06F 21/566 |
| | | | 726/24 |
| 2016/0378693 A1 | 12/2016 | Sasaki et al. | |
| 2017/0118247 A1* | 4/2017 | Hussain | H04L 41/22 |

* cited by examiner

FIG.4

| EXECUTION LOG ID | VERIFICATION RULE ID |
|---|---|
| 9234233 | 1 |
| 2309487 | 2 |
| 2374358 | 3 |
| | ... |

FIG.5

| ITEM | VALUE |
|---|---|
| EXECUTION LOG ID | 9234233 |
| SYSTEM CALL SEQUENCE | open ("HOGE") /ret=4 |
| | write (4, "FOO", 3) /ret=3 |
| | close (4) |
| SIGNATURE | AAAAABBBBBCCCCC··· |

| ITEM | VALUE |
|---|---|
| EXECUTION LOG ID | 2309487 |
| SYSTEM CALL SEQUENCE | write (1, "BAR", 3) /ret=3 |
| SIGNATURE | DDDDDEEEEEFFFFF··· |

| ITEM | VALUE |
|---|---|
| EXECUTION LOG ID | 2374358 |
| SYSTEM CALL SEQUENCE | write (2, "SUCCESS", 7) /ret=3 |
| SIGNATURE | DDDDDEEEEEFFFFF··· |

FIG.6

| VERIFICATION RULE ID | VERIFICATION RULE |
|---|---|
| 1 | ONLY open, write, AND close ARE INCLUDED IN THIS ORDER IN EXECUTION IN SYSTEM CALL SEQUENCE |
| 2 | ONLY write IS INCLUDED IN SYSTEM CALL SEQUENCE, AND FIRST ARGUMENT TO write IS 1 AND SECOND ARGUMENT IS "BAR" |
| 3 | ONLY write IS INCLUDED IN SYSTEM CALL SEQUENCE, AND FIRST ARGUMENT TO write IS 2 AND SECOND ARGUMENT IS "ERROR" |
| | ... |

FIG.8

| ITEM | VALUE |
|---|---|
| EXECUTION LOG ID | 9234233 |
| SYSTEM CALL SEQUENCE | open ("HOGE") /ret=4 |
| | write (4, "FOO", 3) /ret=3 |
| | close (4) |
| RECORDING START TIME | 2019/02/01 10:00:00.1211 |
| RECORDING END TIME | 2019/02/01 10:00:00.4675 |
| SIGNATURE | AAAAABBBBBCCCCC··· |

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2019-044006, filed on Mar. 11, 2019; the entire contents of which are incorporated herein by reference.

FIELD

Embodiments described herein relate generally to an information processing apparatus, an information processing method, and a computer program product.

BACKGROUND

In recent years, a virtualization technology for securely executing a program that is desired to ensure tamper resistance in a single calculator, Intel (registered trademark) SGX (Software Guard Extension), ARM (registered trademark) TrustZone (registered trademark), and the like are becoming widespread. In those environments to securely execute computer programs, it is known to minimize functions of a program that is executed in a secure environment (hereinafter, the secure program) to prevent introduction of vulnerability. On the other hand, there is also a request to implement an advanced process as the secure program. In this case, an external general-purpose OS function is generally used from the secure program. At this point in time, the general-purpose OS needs to operate correctly to cause the secure program to operate correctly.

BRIEF DESCRIPTION OF THE DRAWINGS

FIG. 4 is a diagram illustrating an example of correspondence information according to the first embodiment;

FIG. 5 is a diagram illustrating an example of execution log information according to the first embodiment;

FIG. 6 is a diagram illustrating an example of verification rule information according to the first embodiment;

FIG. 8 is a diagram illustrating an example of the execution log information according to a first modification of the first embodiment;

DETAILED DESCRIPTION

According to an embodiment, an information processing apparatus includes: a memory on which a first processing application and a second processing application are stored, the first processing application being a secure application; and a processor that is coupled to the memory and executes the first and second processing applications. The first processing application includes an issuance module, a first communication module, and a log verification module. The issuance module issues a command to call a function of the second processing application and links the command to a verification rule. The first communication module transmits, to the second processing application, a command execution request including command identification information that identifies the command, and receives, from the second processing application, an execution log including an execution result of the command identified by the command identification information. The log verification module verifies correctness of the execution log received by the first communication module in accordance with the verification rule.

Hereinafter, embodiments of an information processing apparatus will be described in detail with reference to the accompanying drawings.

First Embodiment

Firstly, the configuration of an information processing apparatus 10 of a first embodiment will be described.

First Example of Configuration

Figure 1:
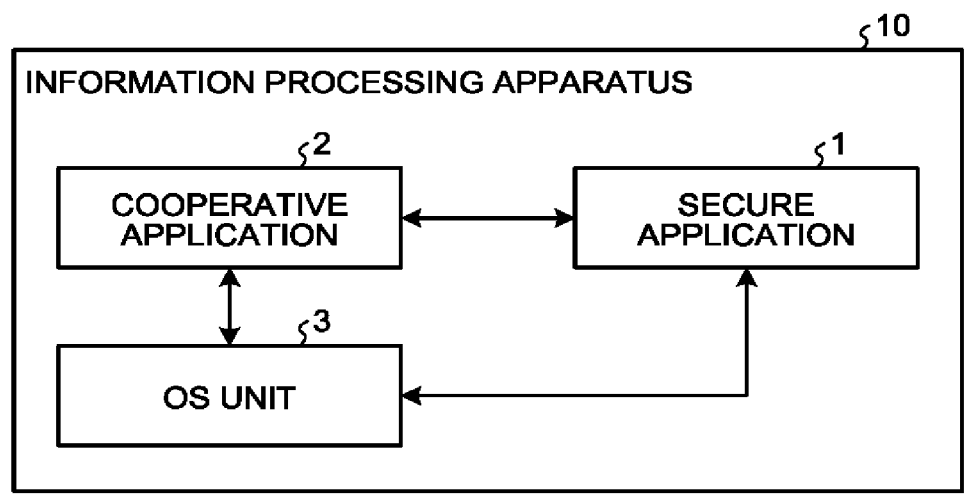
FIG. 1 is a diagram illustrating a first example of a configuration of an information processing apparatus according to a first embodiment.

FIG. 1 is a diagram illustrating a first example of the configuration of the information processing apparatus 10 according to the first embodiment. The information processing apparatus 10 of the first embodiment includes a secure application 1, a cooperative application 2, and an Operating System (OS) unit 3. In the information processing apparatus 10, software other than the secure application 1, the cooperative application 2, and the OS unit 3 may operate.

For example, the secure application 1 and the cooperative application 2 may operate with the OS unit 3. Alternatively, the secure application 1 may operate without the OS, while the cooperative application 2 may operate with the OS unit 3.

The secure application 1 (the first processing application) is executed to be isolated from other applications that operate on the information processing apparatus 10 by a virtualization technology, Intel (registered trademark) SGX, ARM (registered trademark) TrustZone (registered trademark), or the like.

The cooperative application 2 (the second processing application) causes the secure application 1 and the OS unit 3 to cooperate with each other. The cooperative application 2 enables the secure application 1 to use, for example, a function of the OS unit 3.

In the OS unit 3, a rich OS, such as Linux (registered trademark), operates.

The secure application 1, the cooperative application 2, and the OS unit 3 may be separately executed by different apparatuses.

Second Example of Configuration

Figure 2:
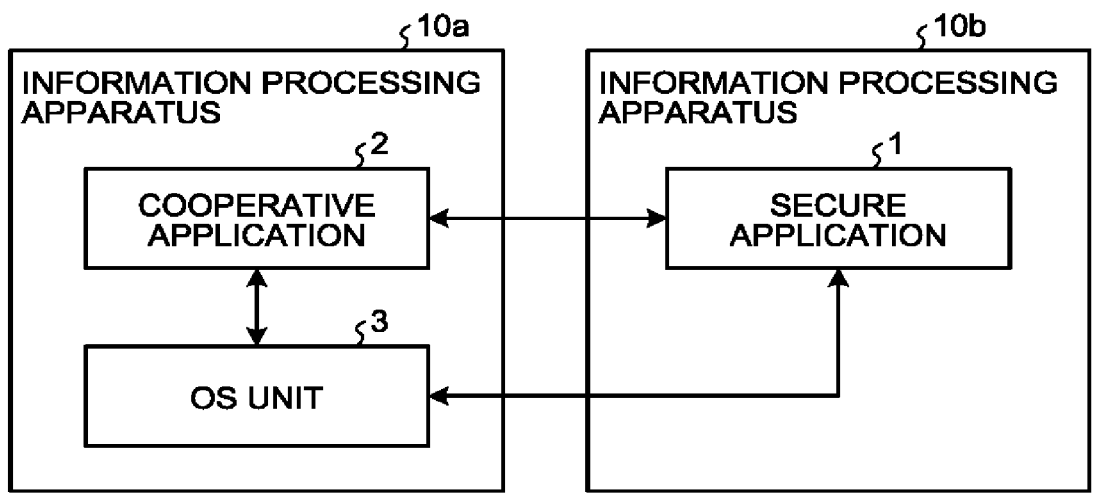
FIG. 2 is a diagram illustrating a second example of a configuration of the information processing apparatus according to the first embodiments.

FIG. 2 is a diagram illustrating a second example of the configuration of the information processing apparatus 10 according to the first embodiment. The example of FIG. 2 represents a case where the cooperative application 2 and the OS unit 3 operate on an information processing apparatus 10a, while the secure application 1 operates on an information processing apparatus 10b.

In the following description of the first embodiment, a detailed description is given of the operation of the information processing apparatus 10, taking the above-mentioned configuration of FIG. 1 as an example.

Example of Functional Configuration

Figure 3:
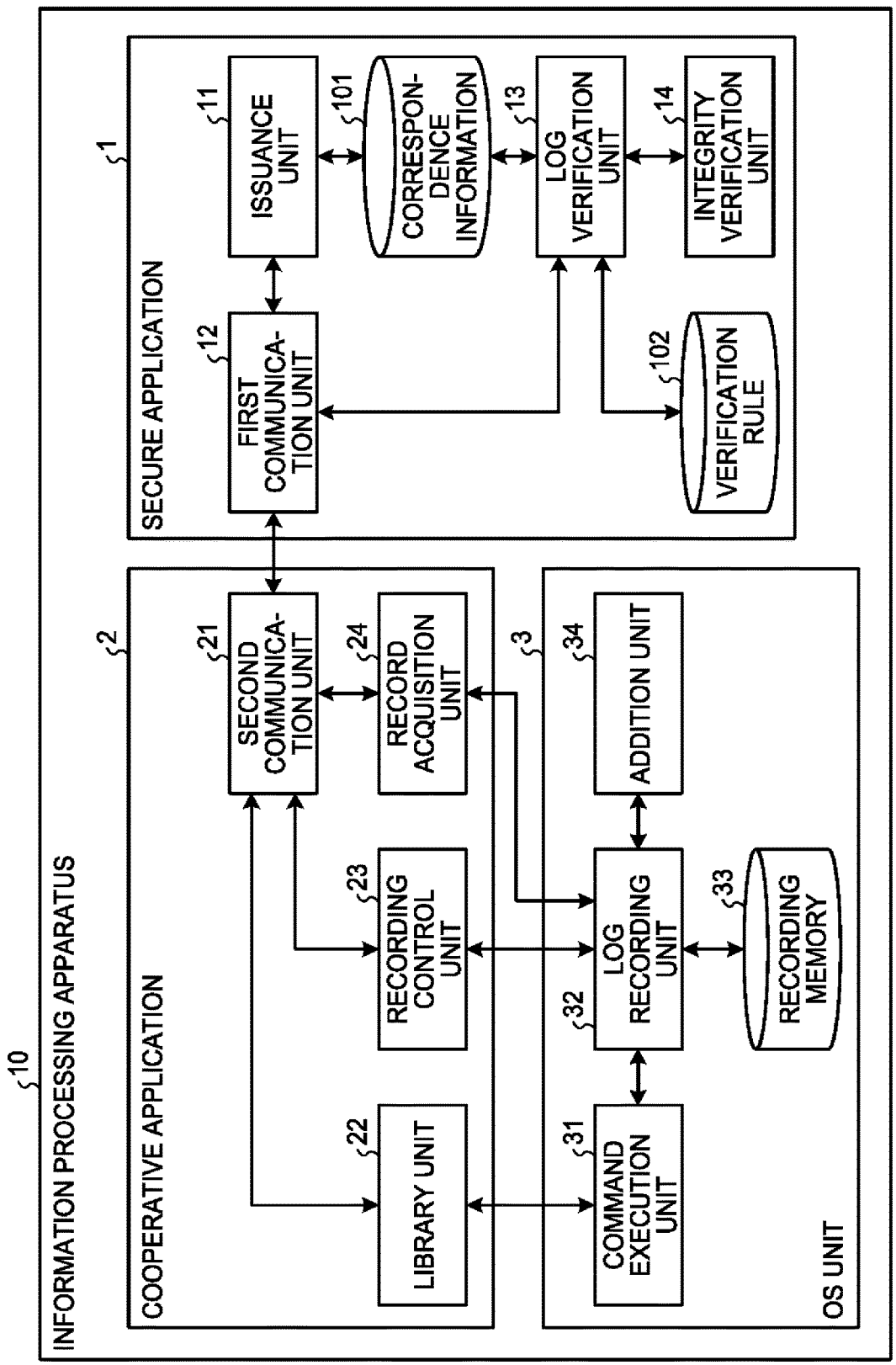
FIG. 3 is a diagram illustrating an example of a functional configuration of the information processing apparatus according to the first embodiment.

FIG. 3 is a diagram illustrating an example of the functional configuration of the information processing apparatus 10 according to the first embodiment. The information processing apparatus 10 of the first embodiment includes the secure application 1, the cooperative application 2, and the OS unit 3.

The secure application 1 includes an issuance unit 11, a first communication unit 12, a log verification unit 13, and an integrity verification unit 14. The secure application 1 holds correspondence information 101 and verification rule information 102.

The cooperative application 2 includes a second communication unit 21, a library unit 22, a recording control unit 23, and a record acquisition unit 24.

The OS unit 3 includes a command execution unit 31, a log recording unit 32, a recording memory 33, and an addition unit 34.

Firstly, the secure application 1 will be described.

The issuance unit 11 issues a command to call a function of the cooperative application 2 (the library unit 22) that provides functions of the OS unit 3.

Specifically, the issuance unit 11 requests a call of a specific function of the OS unit 3 via the first communication unit 12. At this time, the issuance unit 11 passes command identification information (function specification information) and an execution log ID to the first communication unit 12. The command identification information includes information that uniquely identifies a command (a function of the OS unit 3 to be called) (for example, the name and address of a command (function)). The execution log ID is identification information that identifies a call of a command. The execution log ID may be randomly generated, or may be current time information. The issuance unit 11 may also pass a parameter for calling a function (argument information of a command) to the first communication unit 12.

The issuance unit 11 generates the correspondence information 101.

FIG. 4 is a diagram illustrating an example of the correspondence information 101 according to the first embodiment. An execution log ID and a verification rule ID are linked to each other and stored in the correspondence information 101 of the first embodiment. The description of the execution log ID is the same as the above-mentioned description. The verification rule ID is identification information that identifies a verification rule. In the example of FIG. 4, a verification rule representing ID=1 is used when an execution log having an execution log ID=9234233 is verified.

Returning to FIG. 3, the first communication unit 12 communicates with the cooperative application 2. The first communication unit 12 transmits, to the second communication unit 21, a command execution request including command identification information that identifies a command. The first communication unit 12 then receives an execution log of the command from the second communication unit 21.

Specifically, the first communication unit 12 transmits, to the second communication unit 21, a command execution request including command identification information and an execution log ID. When the command includes a parameter, the first communication unit 12 transmits, to the second communication unit 21, the command execution request that further includes the parameter. Moreover, the first communication unit 12 receives an execution log from the second communication unit 21.

FIG. 5 is a diagram illustrating an example of the execution log information according to the first embodiment. The execution log information is stored in the recording memory 33. The execution log information includes one or more execution logs including an execution result of a command identified by the command identification information. Each execution log contains, for example, an execution log ID, a system call sequence, and a signature. The execution log ID is log identification information that identifies an execution log. The system call sequence includes one or more system calls executed by the OS unit 3. Each system call (command) is identified by, for example, the name of the command, the number of the command, and the address of the command.

The signature is a code (a public key signature) that is added to the execution log ID and the system call sequence by using a secret key of the OS unit 3. Instead of the signature, a message authentication code (MAC) using a common key, such as a CMAC (Cipher-based Message Authentication Code) or an HMAC (Hash-based Message Authentication Code) can be employed.

Returning to FIG. 3, the first communication unit 12 passes, to the log verification unit 13, the execution log received from the second communication unit 21 and the execution log ID received from the command issuance unit 11. The first communication unit 12 returns the execution result of the command (library) to the issuance unit 11.

The log verification unit 13 verifies correctness of the execution log in accordance with a verification rule included in the verification rule information 102.

FIG. 6 is a diagram illustrating an example of the verification rule information 102 according to the first embodiment. The verification rule information 102 contains a verification rule ID and a verification rule. The verification rule ID is identification information that identifies a verification rule. The verification rule is used for verifying an execution log. The verification rule includes, for example, a condition of an executed system call.

Returning to FIG. 3, the log verification unit 13 calls the integrity verification unit 14 in order to verify whether or not the execution log passed from the first communication unit 12 has been tampered with. When the execution log has not been tampered with, the log verification unit 13 acquires a verification rule ID corresponding to the execution log ID from the above-mentioned correspondence information (refer to FIG. 4) in order to verify whether or not the system call sequence included in the execution log satisfies the verification rule. The log verification unit 13 then acquires a verification rule corresponding to the verification rule ID from the verification rule information 102 (FIG. 6), and determines whether or not the system call sequence included in the execution log satisfies the verification rule. When the system call sequence satisfies the verification rule, the log verification unit 13 judges that the command (function) of the OS unit 3 has been correctly executed. On the other hand, when the system call sequence does not satisfy the verification rule, or when the tampering of the execution log has been detected, the log verification unit 13 judges that the command (function) of the OS unit 3 has not been correctly executed.

The integrity verification unit 14 verifies integrity of an execution log. Specifically, the integrity verification unit 14 verifies a code generated from an execution log by using a key for detecting tampering. Specifically, when the execution log is signed with public-key cryptography, the integrity verification unit 14 verifies the presence or absence of tampering with a public key corresponding to a secret key of the OS unit 3. When a MAC is added, the integrity verification unit 14 verifies the MAC with the common key and verifies the presence or absence of tampering. The integrity verification unit 14 determines whether or not the execution log ID included in the execution log matches the execution log ID generated by the issuance unit 11. When those IDs do not match, it is also assumed that tampering has occurred.

With referring to FIGS. 4 to 6, the method for verifying an execution log will be specifically described. When an execution result of a command (function) of the OS unit 3 corresponding to the command issued by the issuance unit 11 is verified for the execution log ID=9234233 in FIG. 4, the integrity verification unit 14 verifies the presence or absence of tampering with the execution log. Next, the log verification unit 13 acquires the verification rule ID=1 corresponding to the execution log ID=9234233 from the correspondence information of FIG. 4. The log verification unit 13 acquires the verification rule for the verification rule ID=1 from the verification rule information depicted in FIG. 6.

The verification rule (FIG. 6) linked with the verification rule ID=1 is "only open, write, and close are included in this order in execution in a system call sequence". As shown in FIG. 5, a system call sequence included in the execution log with the execution log ID=9234233 is "open ("HOGE")/ret=4, write (4, "FOO", 3)/ret=3, close (4)". In this case, the verification rule is satisfied, so that the log verification unit 13 judges that the command (function) of the OS unit 3 has correctly been executed.

Similarly, in a case of an execution log ID=2309487 (a verification rule ID=2), the verification rule linked with the verification rule ID=2 is "only write is included in a system call sequence, and the first argument to write is 1 and the second argument is "BAR"". As shown in FIG. 5, a system call included in an execution log with the execution log ID=2309487 is "write (1, "BAR", 3)/ret=3". In this case, the verification rule is satisfied, so that the log verification unit 13 judges that the command (function) of the OS unit 3 has correctly been executed.

Meanwhile, in a case of an execution log ID=2374358 (a verification rule ID=3), a verification rule linked with the verification rule ID=3 is "only write is included in a system call sequence, the first argument to write is 2, and the second argument is "ERROR"". However, as shown in FIG. 5, a system call sequence included in an execution log with the execution log ID=2374358 is "write (2, "SUCCESS", 7)/ret=3". The system call sequence does not match "the second argument is "ERROR"" in the verification rule (FIG. 6) for the verification rule ID=3. Hence, the log verification unit 13 judges that the command (function) of the OS unit 3 has not correctly been executed ("ERROR" has been forged to indicate "SUCCESS").

Next, the cooperative application 2 will be described.

The second communication unit 21 communicates with the secure application 1. Specifically, the second communication unit 21 has a function for communicating with the first communication unit 12. Upon receiving the above-mentioned command execution request from the first communication unit 12, the second communication unit 21 passes the execution log ID included in the command execution request to the recording control unit 23. Next, the second communication unit 21 calls the library unit 22 corresponding to the command identification information included in the command execution request. When the command execution request includes a parameter, the second communication unit 21 passes the parameter to the library unit 22.

When the library unit 22 completes the execution of the command, the second communication unit 21 receives an execution result from the library unit 22. At this time, the second communication unit 21 instructs the recording control unit 23 to end recording and acquires an execution log from the record acquisition unit 24. The second communication unit 21 then transmits the execution log and the execution result to the first communication unit 12.

The library unit 22 breaks the requested command down to one or more OS function call commands (for example, system calls) or commands that are executed in a user mode, and executes the requested command in accordance with the command execution request of the secure application 1. The library unit 22 has the function of being called by the second communication unit 21, breaking a library command down to one or more system calls or user mode commands, and calling the command execution unit 31 in a case of the OS function call commands (a call of a system call). The process of the library unit 22 here may be a process of calling a plurality of the command execution unit 31. Specifically, when a command to output a specific character string to a file is prepared as a library command, the library unit 22 breaks the command down to individual system calls of "File open", "File write", and "File close", and calls the corresponding command execution units 31. Note that, when the functions requested by the secure application 1 and the functions of the OS unit 3 have one-to-one correspondence to each other, the library unit 22 can be removed.

Upon receiving the execution log ID from the second communication unit 21, the recording control unit 23 transmits a log recording start request to the log recording unit 32 and starts recording log information. Specifically, the recording control unit 23 controls the log recording unit 32 in such a manner that the execution log(s) is recorded from the start to the end of the execution of the one or more system calls. During that time, not only the execution of system calls but also the execution of the user mode commands may be recorded. The recording control unit 23 transmits a log recording end request to the log recording unit 32 when the recording is ended.

The record acquisition unit 24 acquires the above-mentioned execution log from the log recording unit 32. Specifically, after transmitting a log acquisition request including an execution log ID to the log recording unit 32, the record acquisition unit 24 receives an execution log corresponding to the execution log ID from the log recording unit 32 and gives the received execution log to the second communication unit 21.

Next, the OS unit 3 will be described.

The command execution unit 31 executes a command in accordance with a request of the library unit 22. Specifically, the command execution unit 31 executes a process corresponding to a system call. During that time, the command execution unit 31 transmits a log addition request on the executed system call to the log recording unit 32.

The log recording unit 32 records the above-mentioned execution log onto the recording memory 33. Specifically, the log recording unit 32 performs a process in accordance with the log recording start request, the log recording end request, the log addition request, the log acquisition request, or the like.

For example, when the log recording start request is received, the log recording unit 32 generates a table in which the execution log included in the execution log information of FIG. 5 is recorded. Then, the log recording unit 32 saves an execution log ID in the table and sets a log recording mode to indicate being under recording.

When the log recording end request is received, the log recording unit 32 sets the log recording mode to indicate ending the recording.

When the log addition request is received while the log recording mode indicates being under recording, the log recording unit 32 additionally writes a system call name, an argument, a return value, and the like of the executed system call, into part of the table (FIG. 5) having an execution log ID corresponding to the execution log to be recorded.

When the log acquisition request is received, the log recording unit 32 calls the addition unit 34. Then, the log recording unit 32 adds a signature to the execution log corresponding to the execution log ID requested for acquisition and gives the execution log to the record acquisition unit 24.

The recording memory 33 is a recording medium on which the above-mentioned execution log information is recorded.

The addition unit 34 adds a code to an execution log. Specifically, the addition unit 34 adds a code of a public key signature or the like to the execution log recorded in the recording memory 33. For example, the addition unit 34 adds a signature to the execution log ID and the system call sequence by using a secret key of the OS unit 3. The addition unit 34 may add a MAC by common-key cryptography instead of the public-key cryptography. An embodiment in a case where a MAC is added in the common-key cryptography will be described in a second modification of the first embodiment.

Next, an example of the verification method of the first embodiment will be described.

Example of Verification Method

Figure 7:
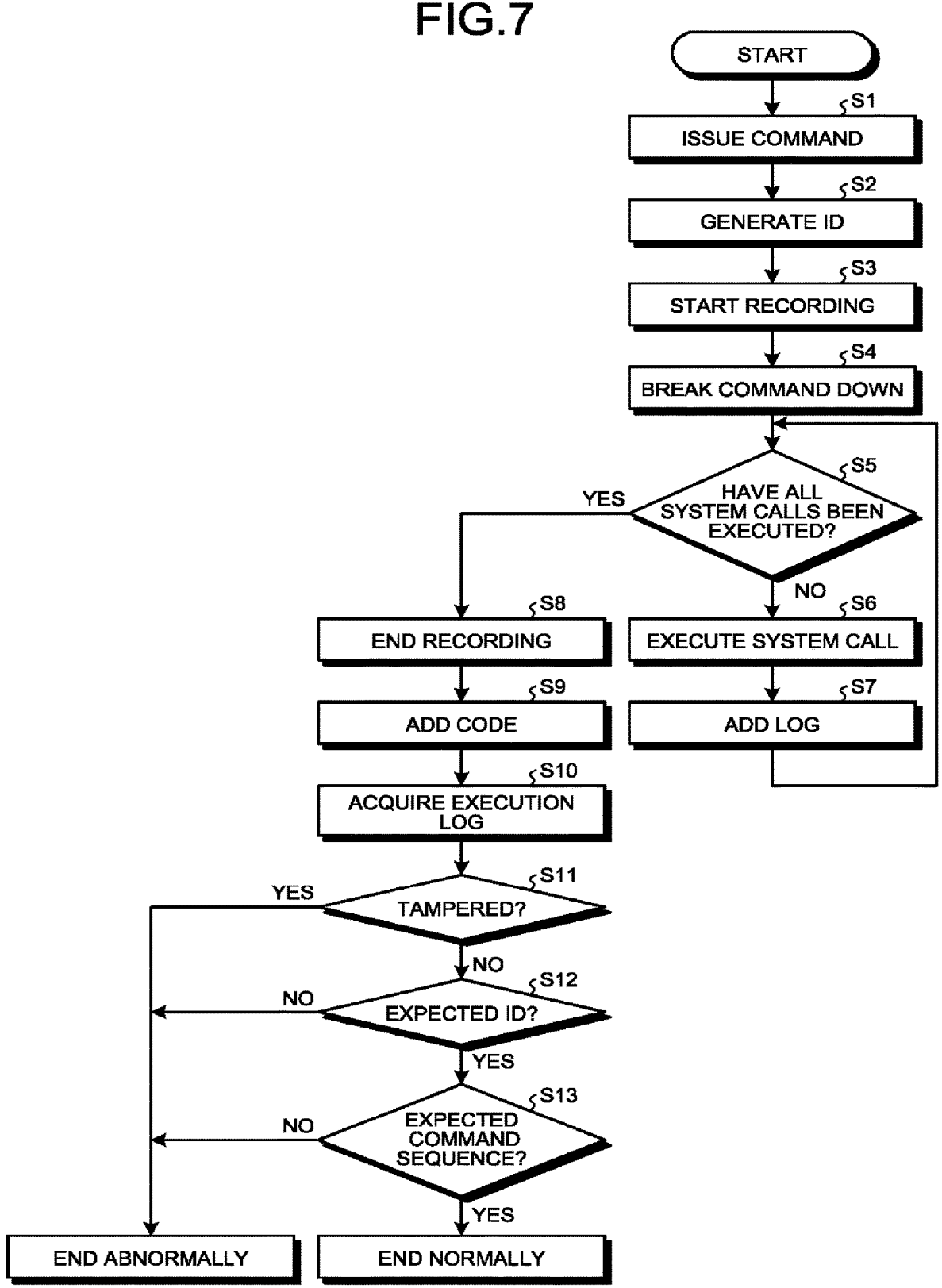
FIG. 7 is a flowchart illustrating an example of a verification method according to the first embodiment.

FIG. 7 is a flowchart illustrating an example of the verification method according to the first embodiment. Firstly, the issuance unit 11 issues a command (Step S1). Next, the issuance unit 11 generates an execution log ID that identifies an execution log (Step S2). The issuance unit 11 transmits command identification information and the execution log ID to the first communication unit 12 and, when there is argument information of the command, transmits the argument information to the first communication unit 12. Moreover, in advance, the issuance unit 11 links the execution log ID to a verification rule ID and registers those IDs in the correspondence information 101 shown in FIG. 4. The first communication unit 12 transmits the above-mentioned command execution request to the second communication unit 21 of the cooperative application 2.

In the cooperative application 2, the log recording unit 32 starts recording an execution log of the command (system calls) of the command execution unit 31 while linking the execution log ID to the execution log to be recorded (Step S3). In order to execute the command corresponding to the call request, the library unit 22 breaks the command down to one or more system calls (Step S4).

The recording control unit 23 determines whether or not all the system calls have been executed (Step S5). When all system calls have not been executed (Step S5, No), unexecuted system call is executed (Step S6). The log recording unit 32 adds the system call executed by the process of Step S6 to the execution log (Step S7).

After that, when all the system calls have been executed (Step S5, Yes), the log recording unit 32 ends recording the execution log, which was started by the process of Step S3 (Step S8). The addition unit 34 adds a code, such as the above-mentioned signature, to the execution log by the public-key cryptography (Step S9). The record acquisition unit 24 acquires the execution log, to which the code has been added by the process of Step S8, from the log recording unit 32 (Step S10). The second communication unit 21 passes the execution log to the secure application 1.

In the secure application 1, the integrity verification unit 14 determines whether or not the log information has been tampered with, by using the public key of the OS unit 3 (Step S11). When the log information has not been tampered with (Step S11, No), the log verification unit 13 determines whether or not the execution log ID included in the execution log matches the execution log ID generated by the issuance unit 11 (Step S12). When those IDs match with each other (Step S12), the log verification unit 13 determines whether or not a system call sequence satisfies a verification rule corresponding to the execution log ID (Step S13).

When the verification rule is satisfied (Step S13, Yes), the verification process is ended normally. When the verification rule is not satisfied (Step S13, No), when the execution log IDs do not match with each other (Step S12, No), and when tampering on the execution log has been detected (Step S11, Yes), the verification process is abnormally ended.

As described above, in the information processing apparatus 10 according to the first embodiment, the secure application 1 (the first processing application) includes the issuance unit 11, the first communication unit 12, and the log verification unit 13. The issuance unit 11 issues a command to call a function of the cooperative application 2 (the second processing application) and links the command to a verification rule (the correspondence information 101). The first communication unit 12 transmits, to the cooperative application 2, a command execution request including command identification information that identifies a command, and receives, from the cooperative application 2, an execution log including an execution result of the command that is identified by the command identification information. The log verification unit 13 verifies the correctness of the received execution log in accordance with the verification rule.

Consequently, according to the information processing apparatus 10 of the first embodiment, it is possible to verify whether or not a call of a command using an external function has been correctly executed. Specifically, for example, it is possible to check whether or not a function of the OS unit 3 has been correctly called by the secure application 1. It becomes possible to prevent introduction of vulnerability to the secure application 1, and also possible to implement an advanced function.

First Modification of First Embodiment

Next, a first modification of the first embodiment will be described. A description similar to the original first embodiment is omitted.

In the original first embodiment, the public key signature is used for adding a code to an execution log. In this case, the OS unit 3 holds a secret key, while the secure application 1 holds a public key corresponding to the secret key. However, if the secret key of the OS unit 3 is leaked to an attacker, it becomes possible to freely forge an execution log. Moreover, if the public key of the secure application 1 is tampered with, it becomes impossible to correctly verify an execution log. In other words, the confidentiality and integrity of code and data of the OS unit 3, and the integrity of code and data of the secure application 1 need to be secured.

It is possible to protect the confidentiality and integrity of code and data of the OS unit 3 by appropriately preventing rewriting and tapping of OS code and OS data by privilege separation of memory, considering the current circumstances where most of vulnerability occurs in an application layer. It becomes possible to protect the integrity of code and data of the secure application 1 by using a technique that adds a signature to an application and conducts a verification in an OS layer, or a technique such as Intel (registered trademark) SGX that detects tampering of an application at a processor level. On the other hand, if a common-key cryptography-based MAC is used to add a code, it is necessary to use a cryptographic technology that does not leak a key even if code and data of an application is leaked, called white-box cryptography.

As a method for attacking a log record, there are attack methods that issues a log recording start request or log recording end request at an illegal timing, and that transmits a log recording start request again after a log recording end request. For example, a system call is issued after the end of log recording and, if a log recording start request is further made again, the system call is not recorded in an execution log. Hence, it is also considerable that it did not operate correctly even it seemingly operated correctly in the log.

In order to address the above inconvenience, the log recording unit 32 of the first modification further records a recording start time and a recording end time onto log information.

FIG. 8 is a diagram illustrating an example of the execution log information according to the first modification of the first embodiment. The execution log information of the first modification contains an execution log ID, a system call sequence, a recording start time, a recording end time, and a signature. The log recording unit 32 of the first modification records a log recording start time when a log recording start request is received, and records a log recording end time when a log recording end request is received. It is necessary to receive a log recording start request and a log recording end request in this order only once with respect to the same execution log ID. Furthermore, the addition unit 34 of the first modification adds a signature to a recording start time and a recording end time.

The log verification unit 13 of the secure application 1 verifies whether or not the recording start time and the recording end time are expected times. For example, the log verification unit 13 judges that the execution log is correct when a difference between the recording start time and the time point where the command was issued is less than a first threshold, and also a difference between the recording end time and the current time is less than a second threshold.

The first communication unit 12 may record a transmission time of a command execution request and a reception time of log information. In this case, the log verification unit 13 checks, for example, a difference between the recording start time and the transmission time and a difference between the recording end time and the reception time. When those differences are greater than thresholds, it is judged that an unexpected process is possibly performed before the start of recording or after the end of the start of recording.

Moreover, information that cannot be rewound by an attacker, such as a cycle counter of a processor, may be used as information indicating the recording start time (and recording end time).

Second Modification of First Embodiment

Next, the second modification of the first embodiment will be described. A description similar to the original first embodiment is omitted. In the second modification, a case of adding a signature by using a common key is described.

Figure 9:
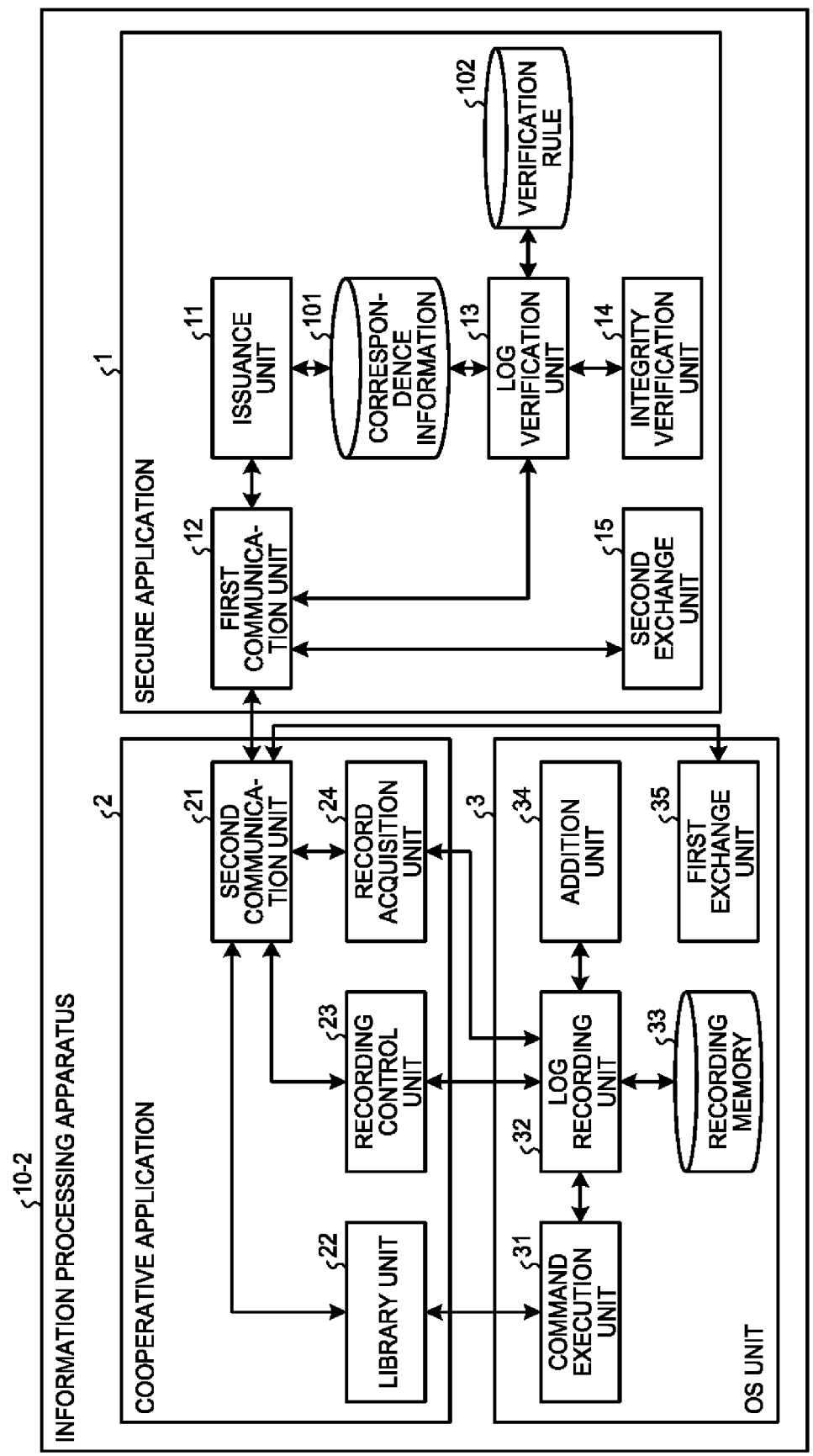
FIG. 9 is a diagram illustrating an example of a functional configuration of an information processing apparatus according to a second modification of the first embodiment.

FIG. 9 is a diagram illustrating an example of the functional configuration of an information processing apparatus 10-2 according to the second modification of the first embodiment. The information processing apparatus 10-2 of the second modification includes the secure application 1, the cooperative application 2, and the OS unit 3.

The secure application 1 includes the issuance unit 11, the first communication unit 12, the log verification unit 13, the integrity verification unit 14, and a second exchange unit 15. The secure application 1 holds the correspondence information 101 and the verification rule information 102.

The cooperative application 2 includes the second communication unit 21, the library unit 22, the recording control unit 23, and the record acquisition unit 24.

The OS unit 3 includes the command execution unit 31, the log recording unit 32, the recording memory 33, the addition unit 34, and a first exchange unit 35.

Accordingly, in the second modification, the second exchange unit 15 is added to the secure application 1, and the first exchange unit 35 is added to the OS unit 3.

When the public-key cryptography is used, the addition unit 34 of the first embodiment is required to add a signature by the public-key cryptography on every call of functions of the OS unit 3. The public-key cryptography is generally greater in processing load than the common-key cryptography. Hence, when a signature is added every time, the overhead of performance increases.

In the second modification, when starting up the secure application 1, authentication is performed by the public-key cryptography between the first exchange unit 35 of the OS unit 3 and the second exchange unit 15 of the secure application 1, and after that, the common key is exchanged. The addition unit 34 adds a code to an execution log by using the common key. The integrity verification unit 14 verifies the code by using the common key.

In the common-key cryptography, tamper resistance is lost when a common key is leaked to an attacker. Therefore, it is necessary to make the common key invisible to a third party other than the OS unit 3 and the secure application 1 at the time of key exchange. Hence, the first exchange unit 35 and the second exchange unit 15 have the function of authentication and the function of key exchanging while concealing the common key.

Example of Key Sharing Method

Figure 10:
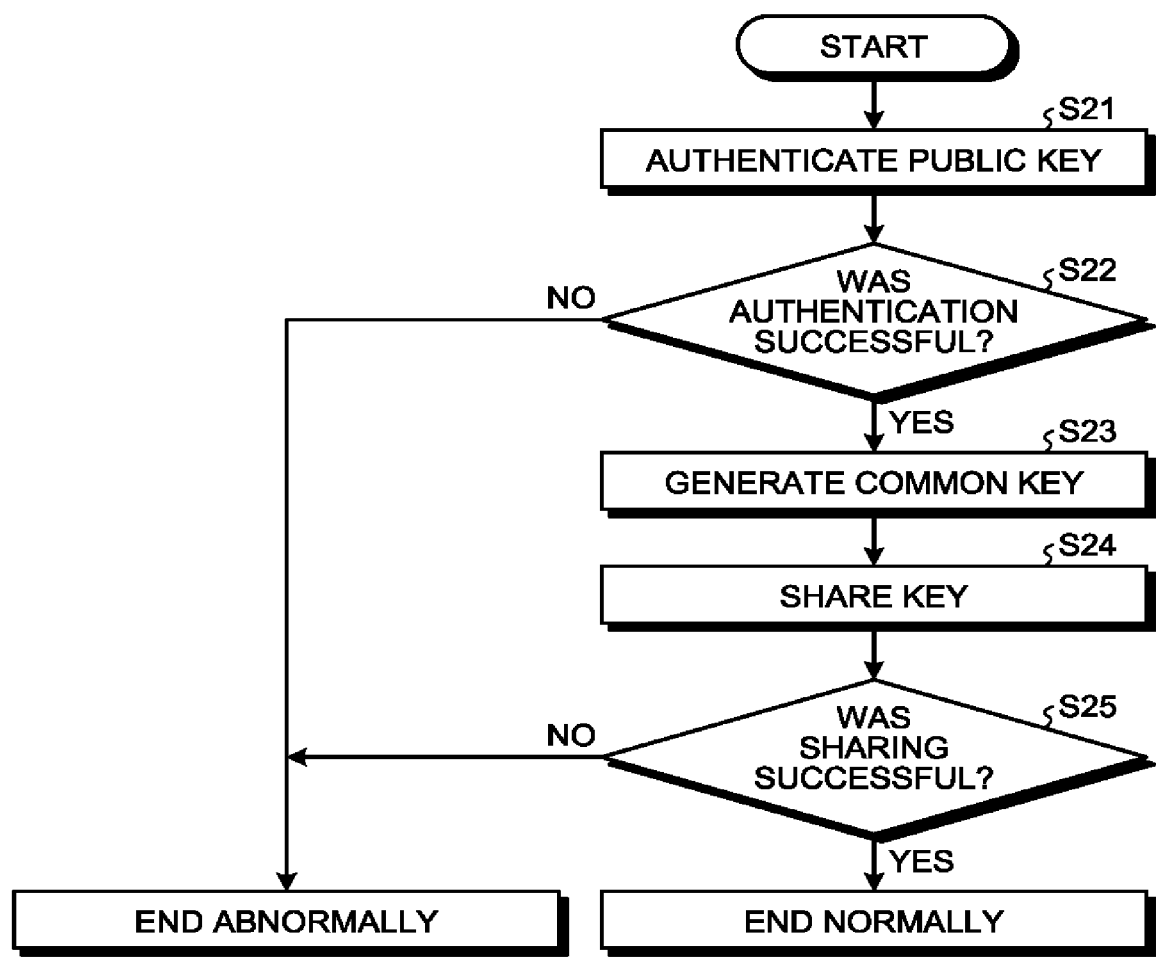
FIG. 10 is a flowchart illustrating an example of a key sharing method according to the second modification of the first embodiment.

FIG. 10 is a flowchart illustrating an example of a key sharing method according to the second modification of the first embodiment. Firstly, a public key authentication process is performed (Step S21). Specifically, the second exchange unit 15 of the secure application 1 generates a random character string or the like, and passes the character string to the first exchange unit 35 of the OS unit 3 via the first communication unit 12 and the second communication unit 21. The first exchange unit 35 puts a signature on the character string by using a secret key and passes the character string with the signature to the second exchange unit 15 of the secure application 1.

In the secure application 1, the second exchange unit 15 verifies the signature put by the public key authentication in Step S1 to determine whether or not the authentication is succeeded (Step S22). When it is determined that the authentication is succeeded (Step S22, Yes), the second exchange unit 15 generates a common key at random (Step S23).

Next, a key sharing process is performed (Step S24). Specifically, the second exchange unit 15 encrypts the common key with a public key of the OS unit 3 and passes the encrypted common key to the first exchange unit 35 of the OS unit 3 via the first communication unit 12 and the second communication unit 21.

After that, the first exchange unit 35 determines whether or not the common key has been successfully shared (Step S25). Specifically, when the encrypted common key was decrypted by using the secret key, the first exchange unit 35 judges that the common key has been successfully shared.

The encrypted common key cannot be decrypted without the secret key of the OS unit 3. Thus, when the OS unit 3 is correctly protected, the key can be securely shared. When the key can be correctly shared, key exchange ends normally. On the other hand, when authentication of a communication destination is failed (Step S22, No), or when sharing of the common key is failed (Step S25, No), it leads to an abnormal end.

The flowchart of FIG. 10 is simply disclosed as an example of authentication/key exchange. There are various systems for authentication and key exchange algorithms, which can be used for the second modification of the first embodiment.

Third Modification of First Embodiment

Next, a third modification of the first embodiment will be described. A description similar to the original first embodiment is omitted. In the third modification, a case where the secure application 1 can directly access the recording memory 33 of the OS unit 3 is described.

Example of Functional Configuration

Figure 11:
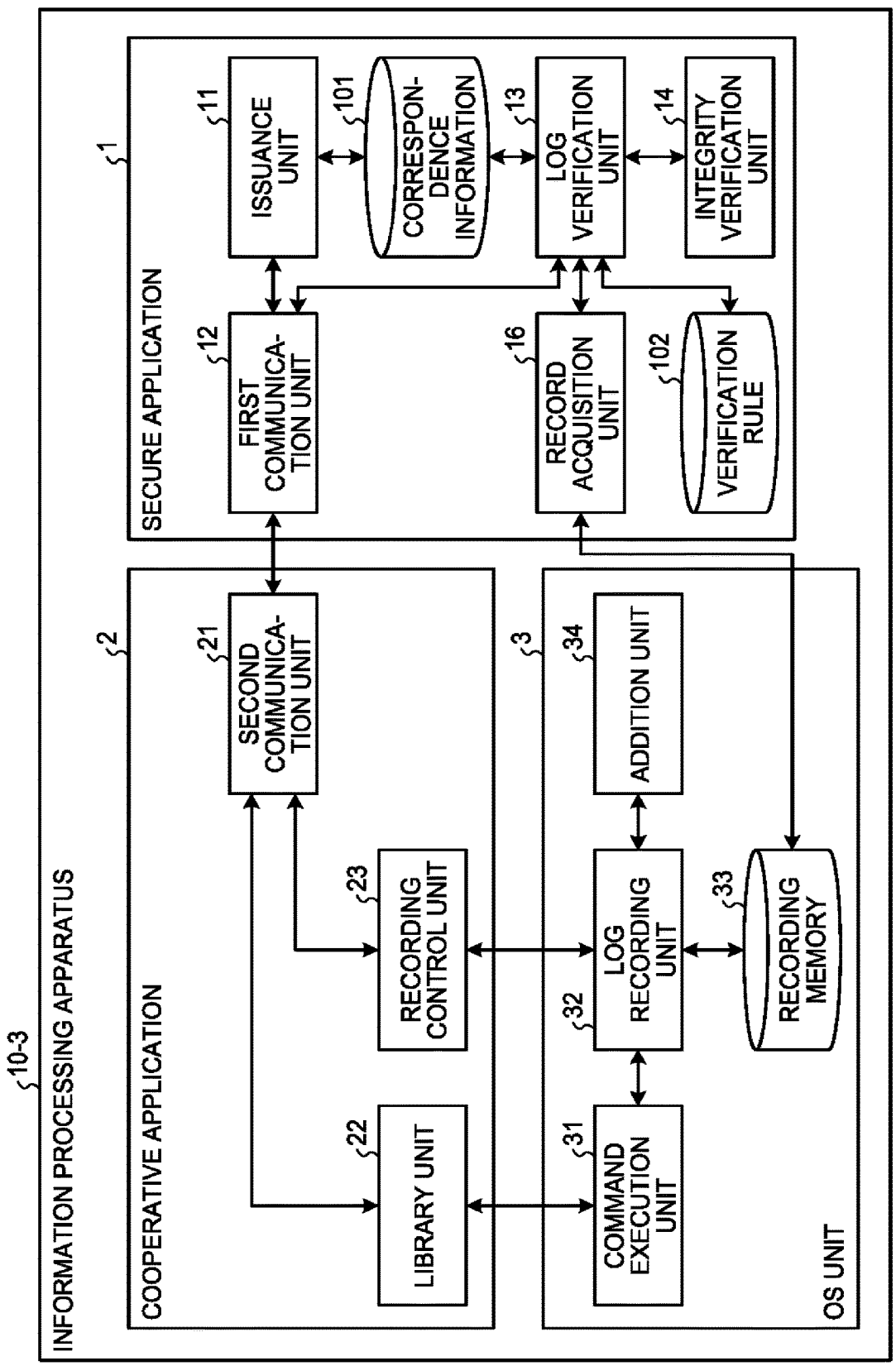
FIG. 11 is a diagram illustrating an example of a functional configuration of an information processing apparatus according to a third modification of the first embodiment.

FIG. 11 is a diagram illustrating an example of the functional configuration of an information processing apparatus 10-3 according to the third modification of the first embodiment. The information processing apparatus 10-3 of the third modification includes the secure application 1, the cooperative application 2, and the OS unit 3.

The secure application 1 includes the issuance unit 11, the first communication unit 12, the log verification unit 13, the integrity verification unit 14, and a record acquisition unit 16. Moreover, the secure application 1 holds the correspondence information 101 and the verification rule information 102.

The cooperative application 2 includes the second communication unit 21, the library unit 22, and the recording control unit 23.

The OS unit 3 includes the command execution unit 31, the log recording unit 32, the recording memory 33, and the addition unit 34.

Accordingly, in the third modification, the record acquisition unit 24 is removed from the cooperative application 2, while the record acquisition unit 16 is added to the secure application 1.

In the original first embodiment, it is assumed that the secure application 1 cannot directly access the recording memory 33, on which the execution log information is stored. The third modification illustrated in FIG. 11 has been made on the assumption that the secure application 1 can directly access the recording memory 33. In the configuration example of the original first embodiment, the second communication unit 21 transmits an execution log to the first communication unit 12. In contrast, in the third modification, the first communication unit 12 calls the record acquisition unit 16. The record acquisition unit 16 then acquires an execution log, which is targeted for verification, from the recording memory 33 by using an execution log ID as a key. In the third modification, the possibility of tampering of an execution log in the cooperative application 2 is eliminated. Thus, when the possibility of tampering in the OS unit 3 can be eliminated, the addition unit 34 and the integrity verification unit 14 can be omitted.

Second Embodiment

Next, the first modification of the first embodiment will be described. A description similar to the original first embodiment is omitted. In the original first embodiment, it is assumed to record execution log information in the OS unit 3. This is on the premise that a new function is added to the OS unit 3. When a change to the existing OS unit 3 is not desired, the original first embodiment is not best. In the second embodiment, a description is given of a configuration for obtaining an effect similar to the original first embodiment with a minimal change to the OS unit 3.

Example of Configuration

Figure 12:
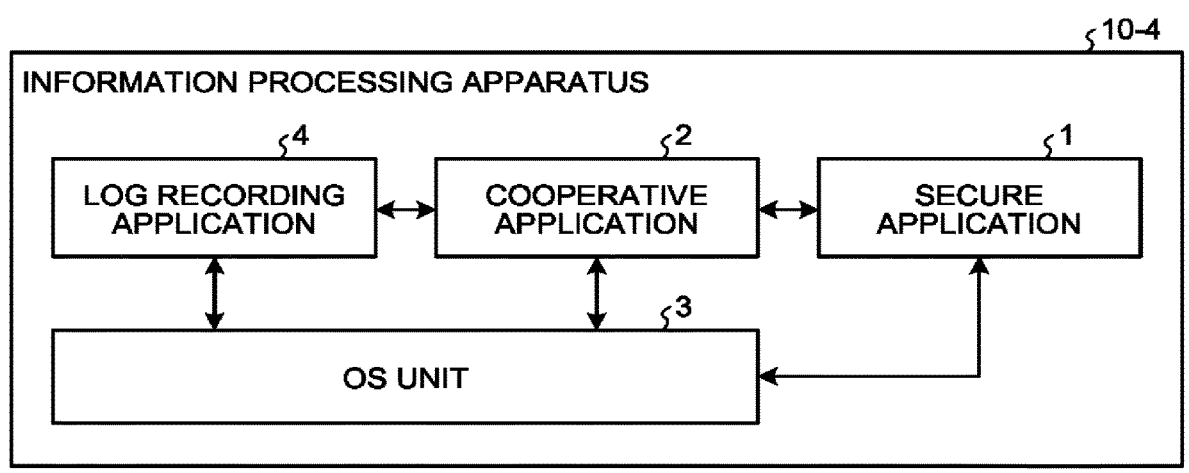
FIG. 12 is a diagram illustrating an example of a configuration of an information processing apparatus according to a second embodiment.

FIG. 12 is a diagram illustrating an example of the configuration of an information processing apparatus 10-4 according to the second embodiment. The information processing apparatus 10-4 of the second embodiment includes the secure application 1, the cooperative application 2, the OS unit 3, and a log recording application 4. In the second embodiment, the log recording application 4 (a third processing application) is introduced. The details of the functional configuration of the log recording application 4 will be described with referring to FIG. 13.

Example of Functional Configuration

Figure 13:
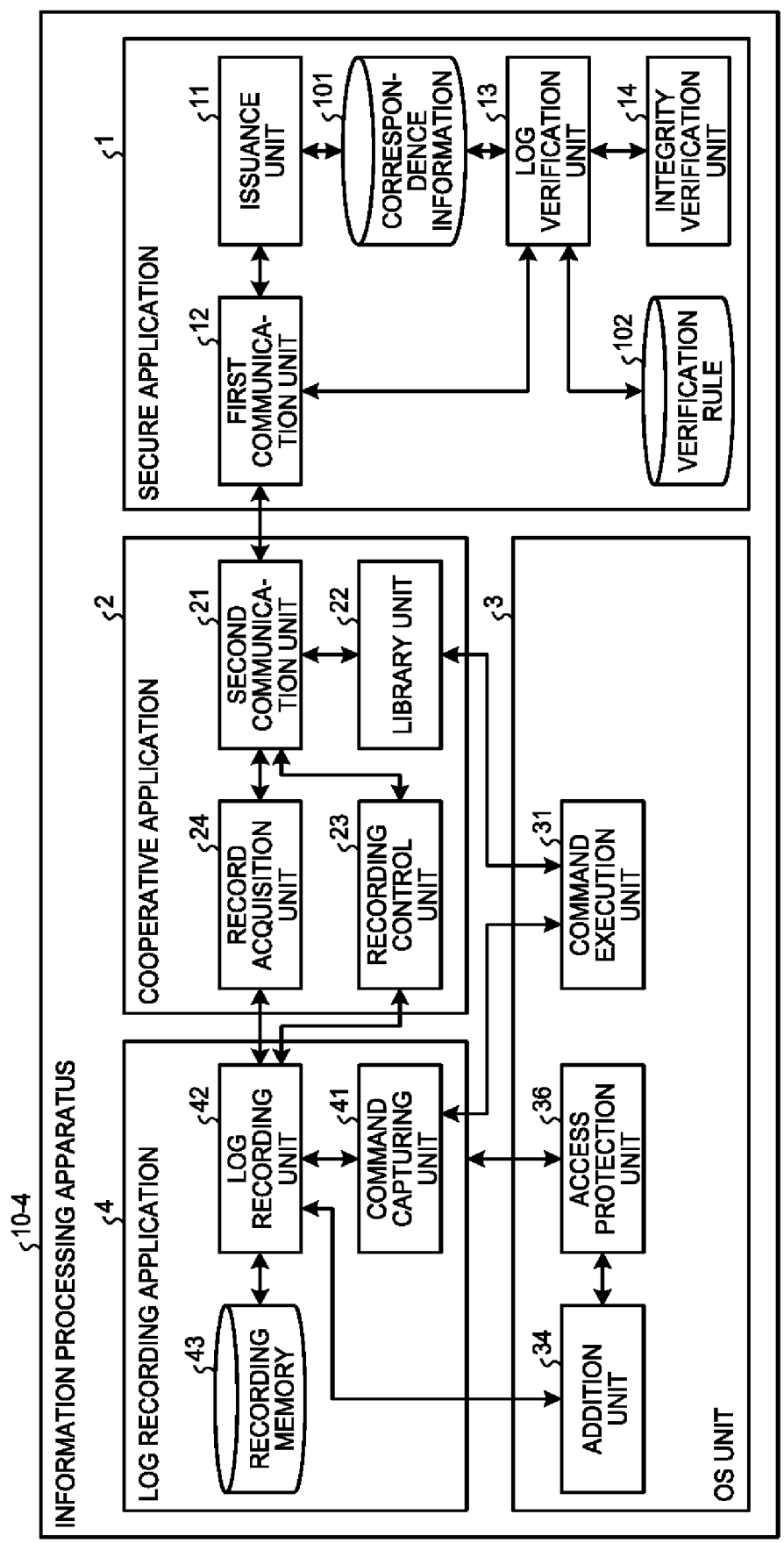
FIG. 13 is a diagram illustrating an example of a functional configuration of the information processing apparatus of the second embodiment.

FIG. 13 is a diagram illustrating an example of the functional configuration of the information processing apparatus 10-4 according to the second embodiment. The information processing apparatus 10-4 of the second embodiment includes the secure application 1, the cooperative application 2, the OS unit 3, and the log recording application 4.

The secure application 1 includes the issuance unit 11, the first communication unit 12, the log verification unit 13, and the integrity verification unit 14. Moreover, the secure application 1 holds the correspondence information 101 and the verification rule information 102.

The cooperative application 2 includes the second communication unit 21, the library unit 22, the recording control unit 23, and the record acquisition unit 24.

The OS unit 3 includes the command execution unit 31, the addition unit 34, and an access protection unit 36.

The log recording application 4 (the third processing application) includes a command capturing unit 41, a log recording unit 42, and a recording memory 43.

Accordingly, in the second embodiment, the log recording unit 42 and the recording memory 43 of the log recording application 4 are substituted for the log recording unit 32 and the recording memory 33, which are in the OS unit 3 in the original first embodiment. Moreover, in the second embodiment, the command capturing unit 41 is added to the log recording application 4, and the access protection unit 36 is added to the OS unit 3.

The command capturing unit 41 captures execution of a command by the OS unit 3. The command capturing unit 41 acquires, for example, information that indicates which function of the OS unit 3 is called and which parameter in the function is designated.

The log recording unit 42 records the captured execution of the command as an execution log onto the recording memory 43. Furthermore, the log recording unit 42 calls the addition unit 34 of the OS unit 3 and adds a code, such as a signature, to the execution log by using a public key.

The access protection unit 36 protects execution of the log recording application 4 so that the log recording application 4 can operate correctly. The access protection unit 36 protects access to, for example, at least one among the command capturing unit 41, the log recording unit 42, and the addition unit 34.

Specific methods for protecting access include, for example, a method that uses a memory protection function, such as an MMU (Memory Management Unit), and prohibits rewrite from another application onto a memory on which data and code of the log recording application 4 are stored. Alternatively, for example, there is a method that detects and prohibits a system call that rewrites memory on which data and codes of the log recording application 4 are stored. Moreover, for example, there is a method that detects a signal such as a process end and discards the signal. Moreover, two or more of the above methods may be combined to protect access. Although it is preferable that the access protection unit 36 detects and prohibits operation inhibition such as memory write, only the detection and notification of operation inhibition may be performed.

Example of Verification Method

Figure 14:
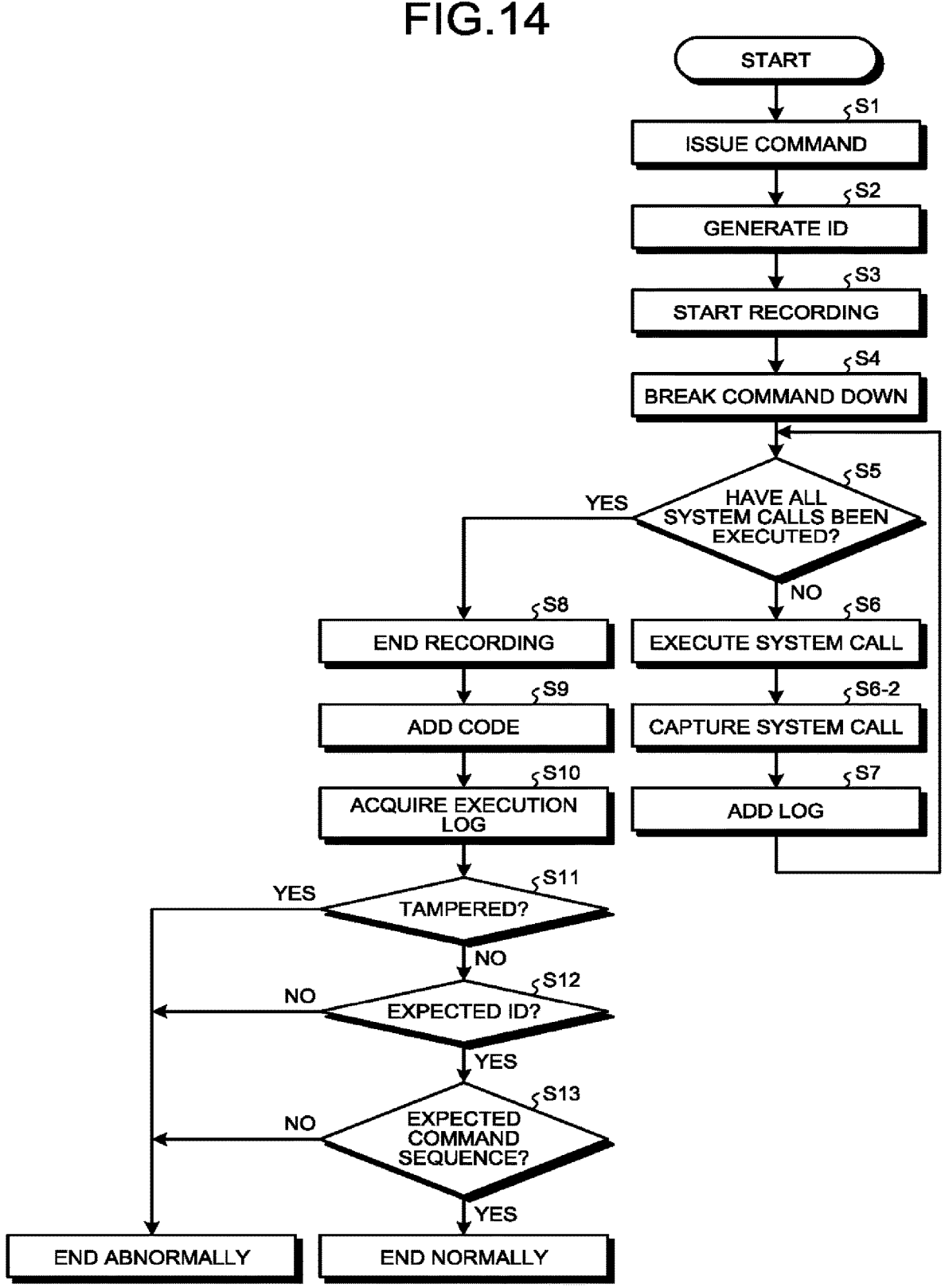
FIG. 14 is a flowchart illustrating an example of a verification method of the second embodiment.

FIG. 14 is a flowchart illustrating an example of a verification method according to the second embodiment. In the verification method of the second embodiment, Step S6-2 is inserted to the verification method of the original first embodiment. In Step S6-2, the command capturing unit captures execution of a command (system call) of the OS unit 3.

As described above, according to the second embodiment, an effect similar to the first embodiment can be obtained with a minimal change to the OS unit 3.

First Modification of Second Embodiment

Figure 15:
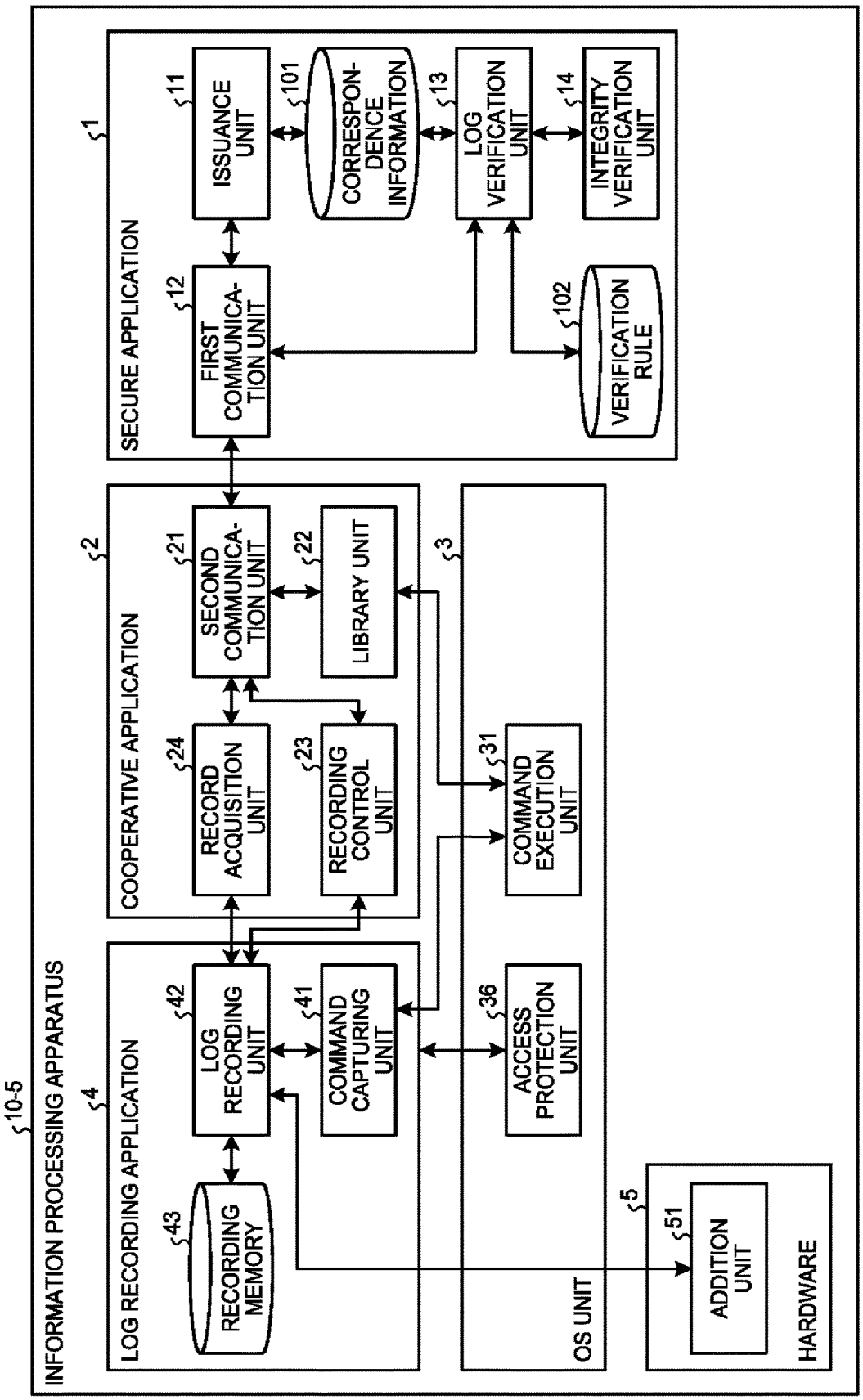
FIG. 15 is a diagram illustrating an example of a functional configuration of an information processing apparatus according to a first modification of the second embodiment.

Next, a first modification of the second embodiment will be described. A description similar to the original second embodiment is omitted. In the original second embodiment, the addition unit 34 that holds a secret key and adds a code is provided in the OS unit 3. In contrast, in the first modification, an addition unit 51 is implemented by hardware 5 as illustrated in FIG. 15.

The hardware 5 is independent hardware such as a processor, TPM (Trusted Platform Module), or HSM (Hardware Security Module). Since there is no need to hold a secret key in the OS unit 3, it becomes more secure. When the capability to calculate public-key cryptography is limited as in TPM, authentication with a public key and the addition of a MAC with a common key may be further combined as in the second modification of the first embodiment.

Instead of the independent hardware 5, the addition unit 51 may be implemented by a virtualization technology or the like such that the addition unit 51 is isolated from an application on the OS unit 3. When the content of execution of an application is assured, it is necessary to prevent introduction of vulnerability in design and implementation to a protection target application, and further correctly protect the app from rewriting of memory from the outside, incorrect shutdown, and the like. Hence, it is difficult to appropriately protect all applications. However, in the embodiment, the protection target is only the single-function log recording application 4. Thus, the prevention of introduction of vulnerability and protection against an attack from the outside is realistic.

According to the first modification of the second embodiment, the content of operation of the log recording application 4 is assured. Therefore, the assurance of the content of execution of another application itself is still difficult, but it becomes possible to robustly verify whether or not the application has operated correctly.

Second Modification of Second Embodiment

Next, a second modification of the second embodiment will be described. A description similar to the second embodiment is omitted. In the second modification, a description is given of a case where the log recording application 4 has the function of adding a code.

Example of Functional Configuration

Figure 16:
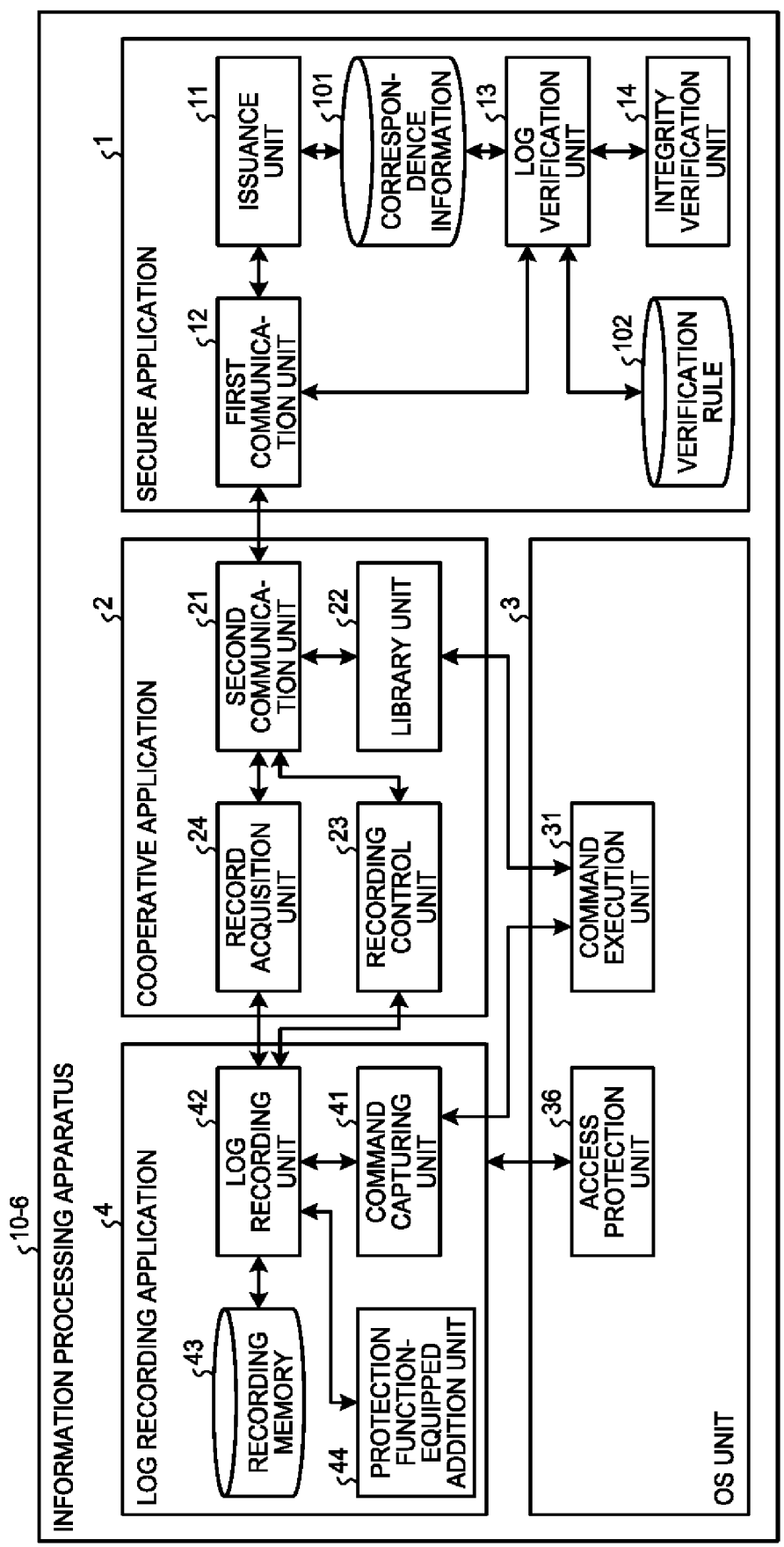
FIG. 16 is a diagram illustrating an example of a functional configuration of an information processing apparatus according to a second modification of the second embodiment.

FIG. 16 is a diagram illustrating an example of the functional configuration of an information processing apparatus 10-6 according to the second modification of the second embodiment. The information processing apparatus 10-6 of the second modification includes the secure application 1, the cooperative application 2, the OS unit 3, and the log recording application 4.

The secure application 1 includes the issuance unit 11, the first communication unit 12, the log verification unit 13, and the integrity verification unit 14. Moreover, the secure application 1 holds the correspondence information 101 and the verification rule information 102.

The cooperative application 2 includes the second communication unit 21, the library unit 22, the recording control unit 23, and the record acquisition unit 24.

The OS unit 3 includes the command execution unit 31 and the access protection unit 36.

The log recording application 4 (the third processing unit) includes the command capturing unit 41, the log recording unit 42, the recording memory 43, and a protection function-equipped addition unit 44.

In the original second embodiment, it is assumed that the addition unit 34 is provided in the OS unit 3. Moreover, in the foregoing first modification of the second embodiment, it is assumed that the addition unit 34 functions as the independent hardware 5, or functions independently of an application in a virtualized environment.

In contrast, in the second modification, the protection function-equipped addition unit 44 is placed in the log recording application 4. Thus, it may be more difficult than a case where a security of confidentiality of code and data exists in the OS unit 3. Hence, a protection function for securing confidentiality/integrity is provided as the code addition function. Specifically, white-box cryptography or an obfuscation technique may be used as the code addition system.

According to the second modification of the second embodiment, an effect similar to the second embodiment can be obtained.

Hereinafter, a description is given of an example of hardware structure of the information processing apparatuses 10 to 10-6 of the first and second embodiments.

Example of Hardware Configuration

Figure 17:
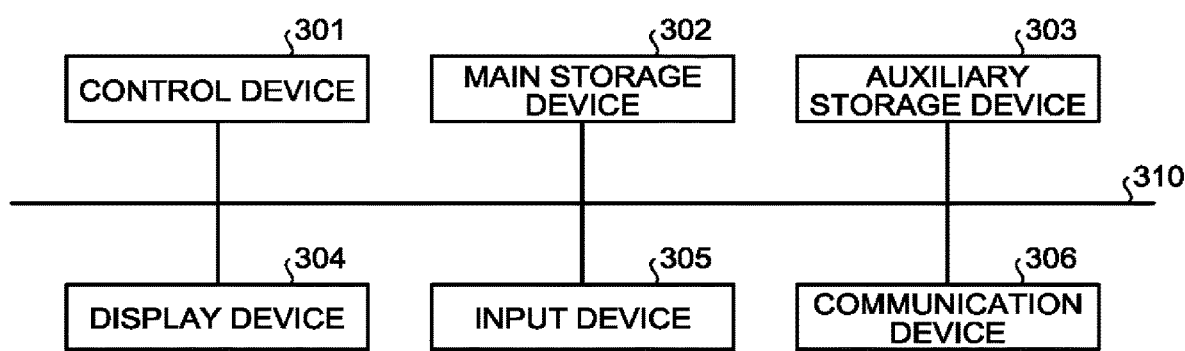
FIG. 17 is a diagram illustrating an example of a hardware structure of the information processing apparatuses according to the first and second embodiments.

FIG. 17 is a diagram illustrating an example of the hardware structure of the information processing apparatuses 10 to 10-6 according to the first and second embodiments. The hardware structure of the information processing apparatuses 10-2 to 10-6 is the same as that of the information processing apparatus 10. Accordingly, the information processing apparatus 10 is described.

The information processing apparatus 10 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

The control device 301 executes a program read from the auxiliary storage device 303 into the main storage device 302. The main storage device 302 is memory such as ROM (Read Only Memory) or RAM (Random Access Memory). The auxiliary storage device 303 is an HDD (Hard Disk Drive), an SSD (Solid State Drive), a memory card, or the like.

The display device 304 displays display information. The display device 304 is, for example, a liquid crystal display. The input device 305 is an interface for operating a computer. The input device 305 is, for example, a keyboard or a mouse. When the computer is a smart device such as a smartphone or a tablet terminal, the display device 304 and the input device 305 are, for example, touchscreens. The communication device 306 is an interface for communicating with another apparatus.

A program executed on the computer is recorded in an installable or executable format file on a computer readable recording medium such as a CD-ROM, a memory card, a CD-R or a DVD (Digital Versatile Disc) and provided as a computer program product. Moreover, the program executed on the computer may be configured to be stored in a computer connected to a network, such as the Internet, and be provided by downloading via the network. Alternatively, the program executed on the computer may be configured to be provided via a network, such as the Internet, without downloading.

Moreover, the program executed on the computer may be configured to be provided by incorporating in advance into ROM or the like.

The program executed on the computer contains modules including a functional block, which can be implemented by a program among the functional configuration (functional blocks) of the above-mentioned information processing apparatus 10. In terms of each of the functional blocks as actual hardware, each of the above functional blocks is loaded onto the main storage device 302 by the control device 301 reading the program from a storage medium and executing the program. In other words, each of the above functional blocks is generated on the main storage device 302.

Part of or all the above-mentioned functional blocks may be implemented by hardware, such as an IC (Integrated Circuit), instead of software.

Moreover, when the functions are implemented by using two or more processors, each processor may implement one of the functions, or two or more of the functions.

Moreover, the operating mode of a computer that realizes the information processing apparatus 10 is arbitrary. For example, the information processing apparatus 10 may be implemented by a single computer. Alternatively, for example, the information processing apparatus 10 may operates in a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory on which a first processing application, a second processing application, a third processing application, and an Operating System (OS) are stored, the first processing application being a secure application executed in a secure environment ensuring tamper resistance; and
a processor that is coupled to the memory and executes the first and second processing applications,
wherein the first processing application includes:
an issuance module configured to issue a command to call a function by the second processing application and link the command to a verification rule,
a first communication module configured to:
transmit, to the second processing application, a command execution request including command identification information that identifies the command, and
receive, from the second processing application, an execution log including an execution result of the command identified by the command identification information,
a log verification module configured to verify correctness of the execution log received by the first communication module in accordance with the verification rule, and
an integrity verification module configured to verify, by using a key for detecting tampering, a code generated from the execution log;
wherein the third processing application includes:
a command capturing module configured to capture execution of the command by the OS, and
a log recording module configured to record, as the execution log, the execution captured by the command capturing module;
wherein the OS includes:
a command execution module configured to execute the command, and
an addition module configured to add the code to the execution log;
wherein the second processing application further includes:
a record acquisition module configured to acquire the execution log from the log recording module, and a second communication module configured to, upon receiving the command execution request from the first communication module, transmit the execution log acquired by the record acquisition module to the first communication module; and wherein the information processing apparatus performs information processing by employing the function by the first processing application, the function by the second processing application, the function by the third processing application, and the function by the OS.

2. The apparatus according to claim 1, wherein the OS further includes a log recording module configured to record the execution log, and wherein the second processing application further includes:

a record acquisition module configured to acquire the execution log from the log recording module, and a second communication module configured to, upon receiving the command execution request from the first communication module, transmit the execution log acquired by the record acquisition module to the first communication module.

3. The apparatus according to claim 2, wherein the addition module adds the code to the execution log by using a secret key, and the integrity verification module verifies the code by using a public key corresponding to the secret key.

4. The apparatus according to claim 2, wherein the OS further includes a first exchange module configured to exchange a common key with an authentication destination after authentication by public-key cryptography, the first processing application further includes a second exchange module configured to exchange the common key with the first exchange module after authenticating the first exchange module by the public-key cryptography, the addition module adds the code to the execution log by using the common key, and the integrity verification module verifies the code by using the common key.

5. The apparatus according to claim 2, wherein the second processing application further includes a library module configured to break the command down to one or more system calls and execute each of the system calls on the command execution module; and a recording control module configured to control the log recording module to record an execution log from start to end of the execution of the one or more system calls.

6. The apparatus according to claim 1, wherein the execution log includes at least one among a name of the command, a number of the command, an address of the command, and log identification information that identifies the execution log.

7. The apparatus according to claim 6, wherein the execution log further includes information indicating a recording start time of the execution log and information indicating a recording end time of the execution log, and, when a difference between the recording start time and a time of the issuance of the command is less than a first threshold and a difference between the recording end time and the current time is less than a second threshold, the log verification module judges that the execution log is correct.

8. The apparatus according to claim 1, wherein the OS further includes an access protection module configured to protect access to at least one among the command capturing module, the log recording module, and the addition module.

9. An information processing method implemented by a computer provided with a first processing application, a second processing application, a third processing application, and an Operating System (OS), the method comprising:

issuing, by the first processing application, being a secure application executed in a secure environment ensuring tamper resistance a command to call a function by the second processing application;

linking, by the first processing application, the command to a verification rule;

transmitting, to the second processing application by the first processing application, a command execution request including command identification information that identifies the command;

receiving, from the second processing application by the first processing application, an execution log including an execution result of the command identified by the command identification information;

verifying, by the first processing application, correctness of the received execution log in accordance with the verification rule;

verifying, by the first processing application using a key for detecting tampering, a code generated from the execution log;

capturing, by the third processing application, execution of the command by the OS;

recording, by the third processing application and as the execution log, the execution captured by the third processing application;

executing, by the OS, the command;

adding, by the OS, the code to the execution log;

acquiring, by the second processing application, the execution log from the third processing application; and upon receiving the command execution request from first processing application, transmitting, by the second processing application, the execution log acquired by the second processing application to the first processing application, wherein the method further includes performing information processing by employing the function by the first processing application, the function by the second processing application, the function by the third processing application, and the function by the OS.

10. A computer program product comprising a non-transitory computer-readable recording medium, on which an executable program is recorded, the program instructing a computer provided with a first processing application and a second processing application, a third processing application, and an Operating System (OS), to perform:

issuing, by the first processing application being a secure application executed in a secure environment ensuring tamper resistance, a command to call a function by the second processing application;

linking, by the first processing application, the command to a verification rule;

transmitting, to the second processing application by the first processing application, a command execution request including command identification information that identifies the command;
receiving, from the second processing application by the first processing application, an execution log including an execution result of the command identified by the command identification information;
verifying, by the first processing application, correctness of the received execution log in accordance with the verification rule;
verifying, by the first processing application using a key for detecting tampering, a code generated from the execution log;
capturing, by the third processing application, execution of the command by the OS;
recording, by the third processing application and as the execution log, the execution captured by the third processing application;
executing, by the OS, the command;
adding, by the OS, the code to the execution log;
acquiring, by the second processing application, the execution log from the third processing application; and
upon receiving the command execution request from first processing application, transmitting, by the second processing application, the execution log acquired by the second processing application to the first processing application, wherein
information processing is performed by employing the function by the first processing application, the function by the second processing application, the function by the third processing application, and the function by the OS.

* * * * *